(12) United States Patent
Moreau et al.

(10) Patent No.: US 6,945,343 B1
(45) Date of Patent: Sep. 20, 2005

(54) MOTORIZED TRAILER WHEEL WITH DIRECT DRIVE AND TRAILER INCORPORATING SAME

(76) Inventors: Mickal Moreau, 131 Lt 1 Old Sandy Hook Rd., Sandy Hook, MS (US) 39478; Tommy Tullos, 3011 Hwy. 18, Brandon, MS (US) 39042

( * ) Notice: Subject to any disclaimer, the term of this patent is extended or adjusted under 35 U.S.C. 154(b) by 23 days.

(21) Appl. No.: 10/249,631

(22) Filed: Apr. 25, 2003

Related U.S. Application Data

(60) Provisional application No. 60/319,205, filed on Apr. 25, 2002.

(51) Int. Cl.[7] .............................................. B60S 13/00
(52) U.S. Cl. ................................ 180/13; 180/11; 280/3
(58) Field of Search ....................... 180/11–13, 19.1, 180/19.2, 65.2; 280/3, 475, 476.1, 767

(56) References Cited

U.S. PATENT DOCUMENTS

| | | | |
|---|---|---|---|
| 3,156,315 A | 11/1964 | Hawgood | |
| 3,356,172 A | 12/1967 | Peckham et al. | |
| 3,370,666 A | 2/1968 | Holtzclaw et al. | |
| 3,387,681 A | 6/1968 | Rabjohn | |
| 3,439,764 A | 4/1969 | Holtzclaw et al. | |
| 3,705,638 A * | 12/1972 | Shock | 180/14.3 |
| 3,783,960 A | 1/1974 | Feliz | |
| 3,853,333 A * | 12/1974 | Sancho et al. | 280/767 |
| 3,861,482 A * | 1/1975 | Stephens et al. | 180/13 |
| 3,865,204 A | 2/1975 | Bueckner, Sr. | |
| 3,942,823 A | 3/1976 | Shields et al. | |
| 4,210,217 A | 7/1980 | Lachowicz | |
| 4,227,706 A * | 10/1980 | Morris | 280/3 |
| 4,416,460 A * | 11/1983 | Morris | 280/3 |
| 4,860,841 A | 8/1989 | Sacco | |
| 5,016,900 A | 5/1991 | McCully | |
| 5,439,069 A * | 8/1995 | Beeler | 180/11 |
| 5,573,078 A * | 11/1996 | Stringer et al. | 180/19.2 |
| 6,142,501 A * | 11/2000 | Fogo et al. | 280/475 |
| 6,347,677 B1 * | 2/2002 | Collins | 180/13 |
| 6,619,671 B1 * | 9/2003 | Fine | 280/3 |

* cited by examiner

*Primary Examiner*—Lesley D. Morris
*Assistant Examiner*—L. Lum
(74) *Attorney, Agent, or Firm*—McGarry Bair PC

(57) ABSTRACT

The invention is a motorized trailer wheel mounted to a trailer tongue jack which has a single power source such as 12-volt battery-powered electric motor and gear reducer. The motor drives a pinion gear which engages a circular rack mounted to the wheel. Operation of the motor is controlled by an electrical switch assembly which can switch among OFF, FORWARD, and REVERSE positions.

20 Claims, 5 Drawing Sheets

MOTORIZED TRAILER WHEEL WITH DIRECT DRIVE AND TRAILER INCORPORATING SAME

CROSS REFERENCE TO RELATED APPLICATIONS

This application claims the benefit of U.S. provisional application Ser. No. 60/319,205, filed Apr. 25, 2002, which is incorporated herein in its entirety.

BACKGROUND OF INVENTION

1. Field of the Invention

The invention relates to trailers with a tongue with an attached wheel. In one aspect, the invention relates to a motorized wheel assembly for such trailers.

2. Description of the Related Art

Recreational watercraft, off-road vehicles, and similar pleasure craft are frequently transported by trailers towed behind an automobile, pickup truck, or similar vehicle. The trailer will typically a have a tongue which engages a ball hitch on the towing vehicle. When the trailer is being stored, the tongue of the trailer is frequently supported on a wheeled jack which is adjustable by means of the jack to maintain the trailer in a generally horizontal position. The wheel also enables the trailer to be moved without rehitching the trailer to the towing vehicle.

The trailer is typically moved by pushing the trailer by hand. However, trailers which are heavily loaded may be difficult to move by hand, particularly on a surface that is uneven or somewhat inclined, such as a driveway or pavement having construction joints. Furthermore, once the trailer begins moving, it may be difficult to control its movement or to position the trailer in the desired location. Consequently, the towing vehicle must frequently be used to move the trailer, which necessarily prevents the vehicle from being used for its primary purposes. As well, the towing vehicle may not be conveniently available when it is necessary to move the trailer. Space limitations may also make it difficult to move the trailer as desired using the towing vehicle.

One such prior art solution to this problem of moving the trailer is to motorize the wheel on the jack. For example, U.S. Pat. No. 3,861,482 to Stephens et al discloses a wheel assembly for attaching to a tongue of a trailer with an electric motor for driving the wheel. The motor is suspended on a wheel support bracket and drives the wheel through a gear reduction connecting the motor output shaft to the wheel axle.

As another example, U.S. Pat. No. 3,783,960 to Feliz discloses a motorized drive assembly for a trailer tongue wheel. The wheel is connected to an electric motor through a gear reducer and a sprocket and chain drive between the output shaft of the reducer and the wheel axle. The controls for the drive assembly are mounted in a switch box at the end of an extension cord.

The prior art motor assemblies are typically connected directly to the wheel axle, thus complicating removal of the wheel for replacement of the tire or other maintenance and repair. Furthermore, the drive assembly may utilize an internal combustion motor, which is loud and produces a noxious exhaust which is unacceptable for use in small or confined areas. Finally, some drive assemblies utilize intervening drive mechanisms between the motor and the wheel, such as a combination gear reducer and chain drive comprising multiple parts, which requires additional maintenance, and is complicated and costly to manufacture.

SUMMARY OF INVENTION

In one aspect, the invention relates to a trailer with a tongue-mounted, adjustable jack having a ground-contacting end for supporting a trailer tongue when the trailer is disconnected from a towing vehicle, and a direct-drive motorized trailer wheel assembly attached to the jack for moving the disconnected trailer, the motorized trailer wheel assembly comprising: a wheel bracket mounted to the ground-contacting end of the jack; a wheel mounted to the wheel bracket and comprising a wheel rim and a circular gear-toothed rack mounted somewhat inwardly of the rim with the gear teeth extending radially inwardly; an electric motor having a rotating motor shaft, the motor shaft terminating in a pinion gear, the motor being removably mounted to the wheel bracket by a motor bracket, the motor shaft extending through the wheel bracket toward the wheel so that the pinion gear engages the rack; an electrical switch operably connected to the motor and controlling the operation of the motor between an off position, a clockwise rotation position, and a counterclockwise rotation position for selectively alternating the direction of rotation of the motor between a clockwise and a counterclockwise direction; and an electric power supply for providing electric power to the motor thereby rotating the motor shaft and pinion gear and urging the circular rack and wheel to rotate.

In another aspect, the invention relates to a direct-drive motorized trailer wheel assembly for moving a trailer having an adjustable jack with a ground-contacting end for supporting a trailer tongue when the trailer is disconnected from a towing vehicle, comprising: a wheel bracket mounted to the ground-contacting end of the jack; a wheel mounted to the wheel bracket and comprising a wheel rim and a circular gear-toothed rack mounted somewhat inwardly of the rim with the gear teeth extending radially inwardly; an electric motor having a rotating motor shaft, the motor shaft terminating in a pinion gear, the motor being removably mounted to the wheel bracket by a motor bracket, the motor shaft extending through the wheel bracket toward the wheel so that the pinion gear engages the rack; an electrical switch connected to the motor through electrical wiring and controlling the operation of the motor between an off position, a clockwise rotation position, and a counterclockwise rotation position for selectively alternating the direction of rotation of the motor between a clockwise and a counterclockwise direction; and an electric power supply for providing electric power to the motor thereby rotating the motor shaft and pinion gear and urging the circular rack and wheel to rotate.

Various embodiments of the invention are also contemplated. The wheel can further comprise a pneumatic tire. The wheel can also further comprise a solid rubber tire. The electric motor can operate with a clockwise rotation when current is supplied to the motor in a first direction, and with a counterclockwise rotation when current is supplied to the motor in a second direction. The electric power supply can be a 12-volt direct current power supply. The 12-volt direct current power supply can be a battery. The battery can be mounted to the trailer. The wheel can be rotatable about a vertical axis. The switch can be connected to the motor through electrical wiring. The switch can be connected to the motor through a wireless transmitter, a receiver, and a controller.

DETAILED DESCRIPTION

Figure 1:
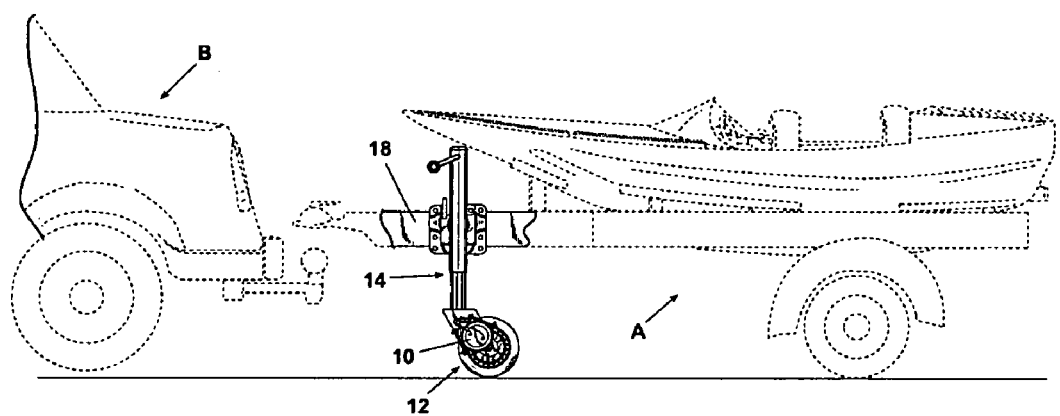
FIG. 1 is a side view of a trailer comprising a tongue-mounted jack with an attached motorized trailer wheel assembly according to the invention, and a typical towing vehicle.

Referring to FIG. 1, a conventional prior art trailer A, such as for transporting a boat or off-road vehicle, is provided with a tongue 18 which is hitched to a towing vehicle B in a conventional manner, such as with a ball hitch. The tongue 18 is provided with a tongue-mounted jack 14 for supporting the trailer A when it is unhitched from the towing vehicle B. The jack 14 is provided with a wheel 12 which enables the unhitched trailer A to be moved short distances without rehitching the trailer A to the towing vehicle B. The wheel 12 is provided with a motorized wheel assembly 10 according to the invention.

Referring now to FIGS. 2–6, the motorized wheel assembly 10 comprises the wheel 12, the jack 14 mounted to the trailer tongue 18, and an electric motor 16. The jack 14 is a conventional trailer jack well-known in the art for supporting the tongue of a trailer when the trailer is not connected to a towing vehicle. The jack 14 is retracted when the trailer is being towed, and is lowered when the trailer is to be unhitched from the towing vehicle, typically utilizing a crank-operated gear driven mechanism. The tongue 18 is thus supported on the jack 14 in the unhitched position, and the jack 14 can be extended and retracted to adjust the trailer to a generally horizontal attitude for storage.

Figure 2:
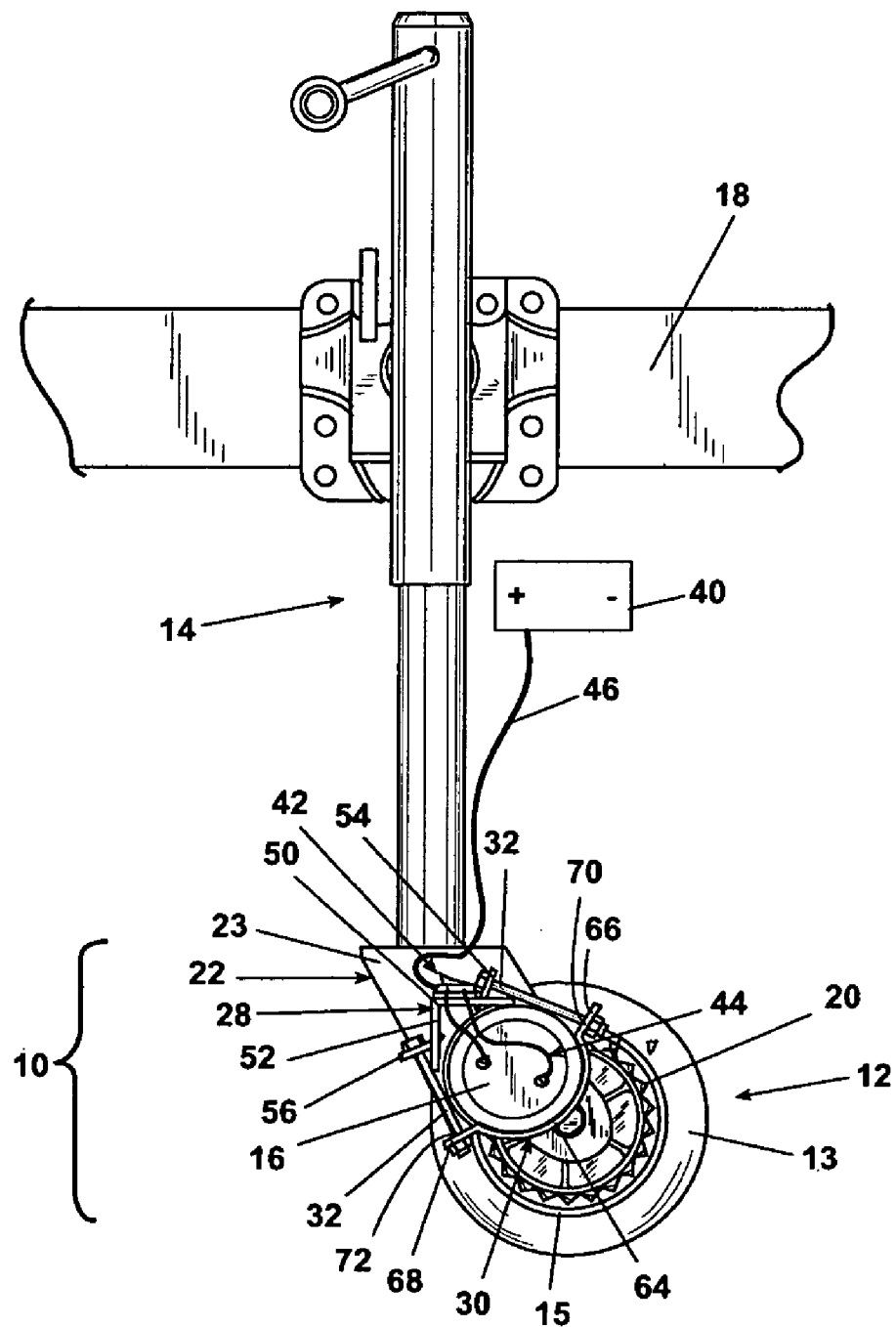
FIG. 2 is a perspective view of a first embodiment of the motorized wheel assembly of FIG. 1 comprising a motor, a control switch, a wheel, and mounting brackets according to the invention.
Figure 3:
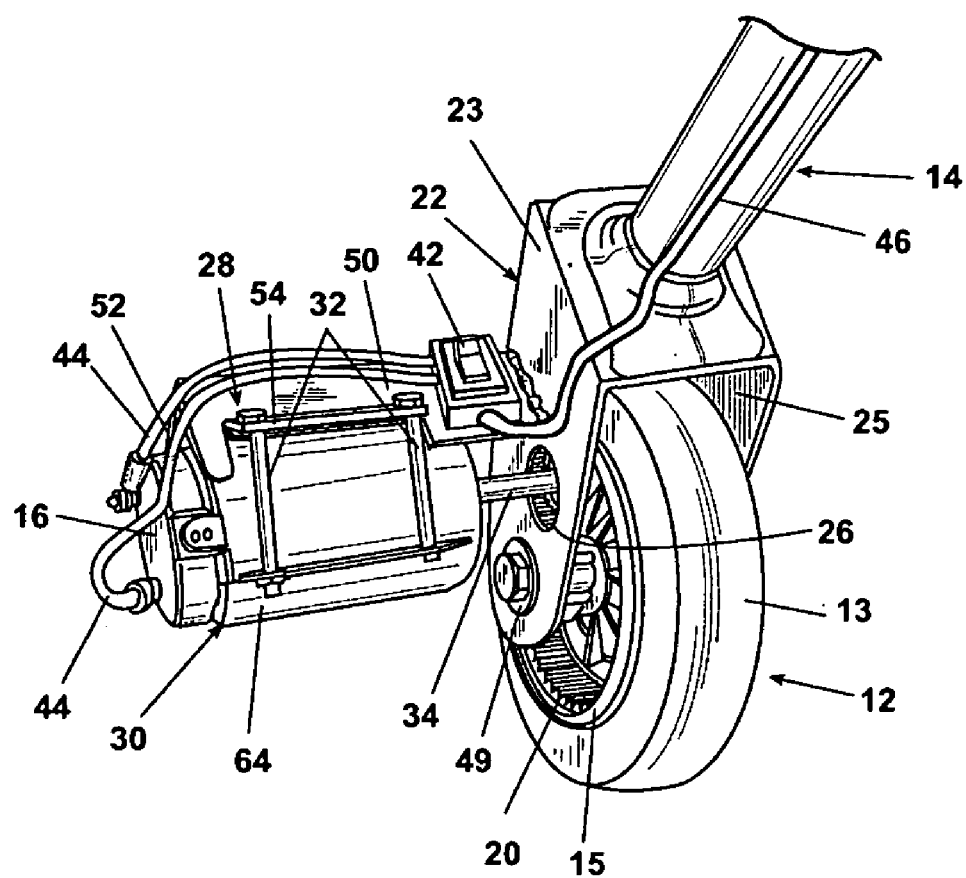
FIG. 3 is a side view of the motorized wheel assembly of FIG. 2.

In the preferred embodiment, the wheel 12 comprises a conventional rubber tire 13, preferably pneumatic, mounted to a steel rim 15 which is provided with a circular gear-toothed rack 20. The rack 20 is fixedly mounted to the wheel 12 somewhat inwardly of the rim 15, such as by molding or casting the rack into the rim, or welding or bolting the rack to the rim, with the gear teeth extending radially inwardly. The wheel 12 is provided with a conventional axle 48 and axle bearing (not shown) which is journaled into a wheel bracket 22 as hereinafter described. In FIG. 2, the axle 48 is threaded and secured to the wheel bracket 22 with an axle nut 49.

In the preferred embodiment, the wheel bracket 22 comprises an inverted U-shaped member attached to the jack 14 for pivoting of the wheel 12 relative to the jack 14 about a vertical axis. For example, the wheel bracket 22 can be pivotally-attached to the lower end of the jack 14. Alternatively, the jack 14 can comprise a lower, extendable portion which can be pivoted and extended relative to an upper portion, with the wheel 12 rigidly attached to the lower portion. The wheel bracket 22 comprises first and second generally parallel flanges 23, 25 interconnected by a bight portion and adapted to extend over both sides of the wheel 12. The flanges 23, 25 are provided with coaxial wheel axle apertures 24 therethrough adapted to receive the wheel axle 48. Additionally, the first flange 23 has a circular motor shaft aperture 26 extending therethrough. The motor shaft aperture 26 is adapted to slidably receive a motor shaft 34 of the motor 16 as hereinafter described.

Figure 5:
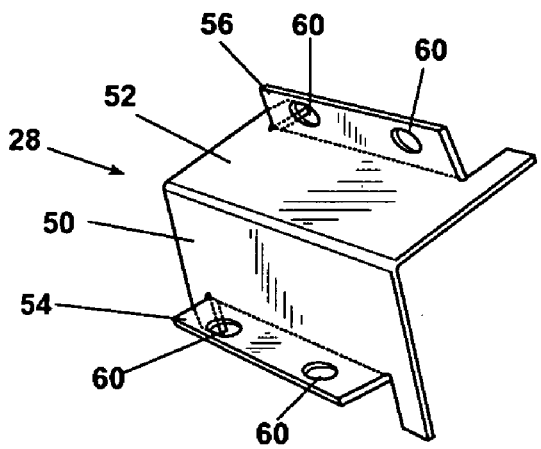
FIG. 5 is a detailed view of a motor bracket shown in FIG. 4 for mounting the motor to a wheel bracket.

Referring also to FIG. 5, a motor bracket 28 comprises an elongated angle-shaped member rigidly attached to the first flange 23, such as by welding. The attachment of the motor bracket 28 to the flange 23 is adapted to align the motor 16 so that the motor shaft 34 extends through the motor shaft aperture 26 and rotates freely therein, as hereinafter described. The motor bracket 28 comprises two generally orthogonal legs 50, 52, each provided with a fastener ear 54, 56 extending outwardly therefrom with fastener apertures 58, 60, respectively, extending therethrough and adapted to receive conventional fasteners 32, preferably threaded fasteners such as bolts. The motor 16 engages and is cradled by the legs 50, 52. In the preferred embodiment, the ears 54, 56 are stamped from the legs 50, 52. However, the ears 54, 56 can comprise separate plates that are rigidly attached in the desired position to the legs 50, 52, such as by welding.

Figure 4:
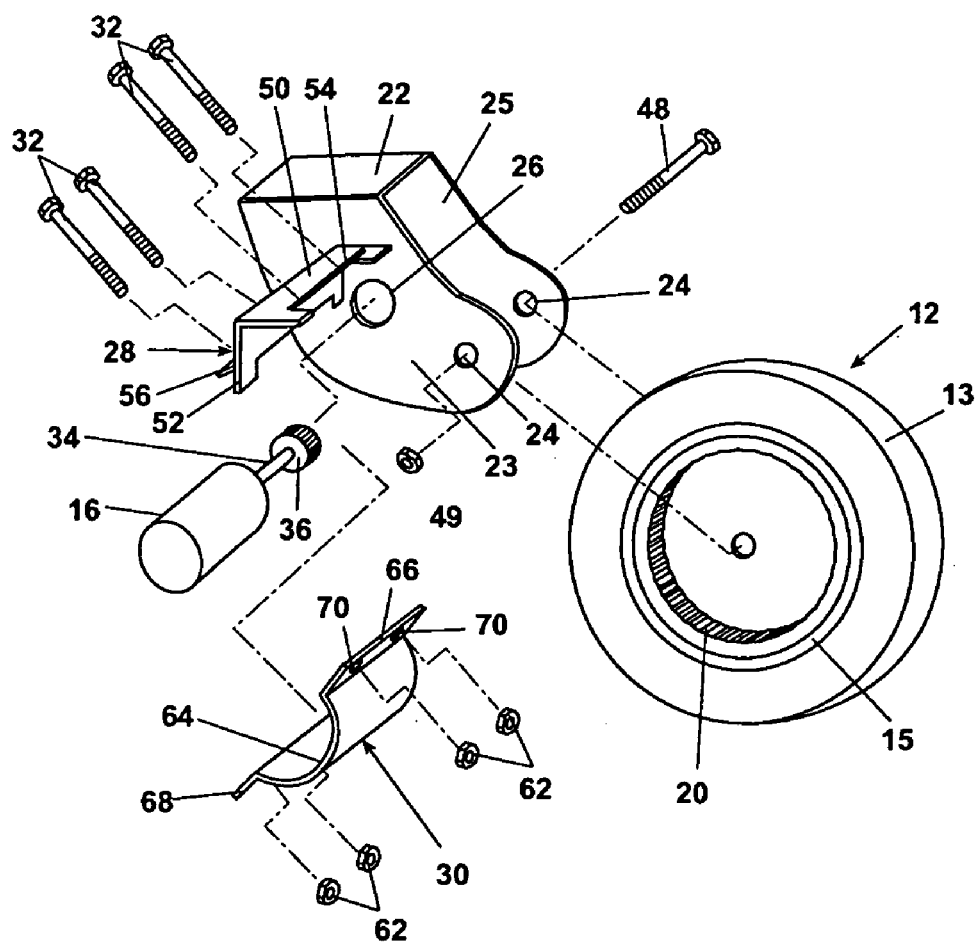
FIG. 4 is an exploded perspective view of the motorized wheel assembly of FIG. 2 showing a motor shaft, a pinion gear and a wheel-mounted circular rack.
Figure 6:
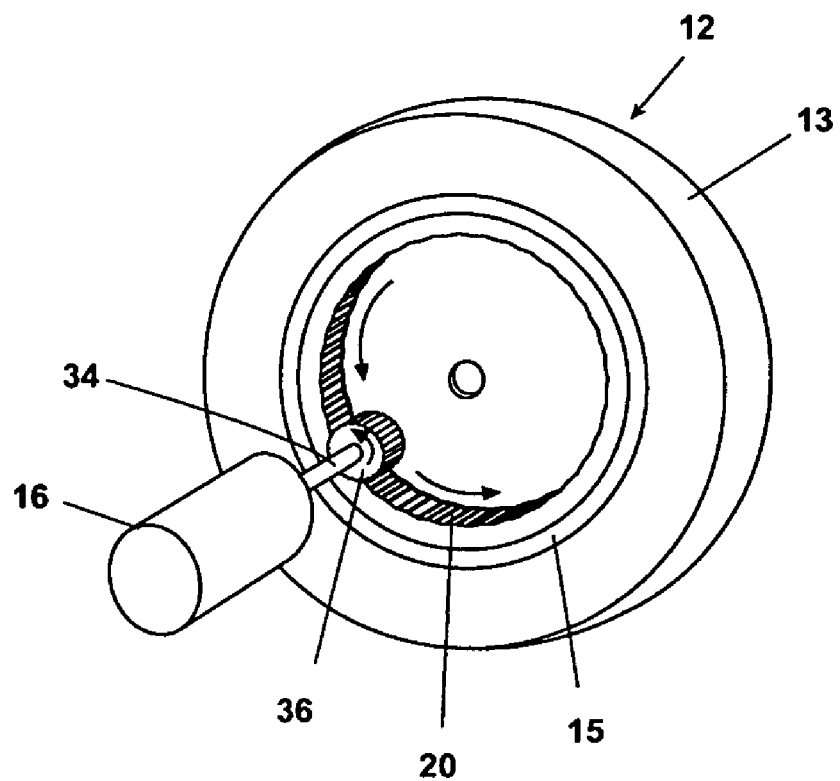
FIG. 6 is a detailed view of the motor shaft, the pinion gear, and the circular rack of FIG. 4.

In the preferred embodiment the motor 16 is a conventional 12-volt DC electric motor having a generally cylindrical shape with a motor shaft 34 extending axially therefrom and rotating with operation of the motor. A suitable motor is a PZ Series sub-FHP DC Parallel Shaft Gearmotor manufactured by Leeson Electric Corp., Grafton, Wis., developing up to 100 lb.-in. of torque at 30 RPM and capable of reversible operation with reversal of the current supplied to the motor. A pinion gear 36 is rigidly attached to the free end of the motor shaft 34, and is adapted to engage and rotate the rack 20 when the motor 16 is operated (FIGS. 4 and 6).

The motor 16 is attached to the motor bracket 28 so that the motor shaft 34 passes through the motor shaft aperture 26 with the pinion gear 36 operationally communicating with the rack 20. A motor strap 30 comprises a thin, strap-like member which is formed into a partially circular center curved portion 64 adapted to engage the exterior of the cylindrically-shaped motor casing, and outwardly extending fastener ears 66, 68 with fastener apertures 70, 72 extending therethrough (FIG. 4). When the motor strap 30 is aligned with the fastener ear 54, 56 so that the fastener apertures 58, 60 are axially aligned with the fastener apertures 70, 72, the threaded fasteners 32 can be inserted through the apertures 58, 60, 70, 72 and secured with nuts 62.

Tightening of the fasteners 32 will draw the motor strap 30 toward the motor bracket 28, rigidly securing the motor 16 against the bracket 28 and retaining the pinion gear 36 in operable communication with the rack 20. Repositioning or removal of the motor 16 to enable removal of the wheel 12 can be accomplished by simply loosening the fasteners 32 and nuts 62 sufficiently to release the motor strap 30 from the motor 16.

A control switch 42 comprises a generally conventional electrical switch suitable for use in a 12-volt DC circuit, and capable of switching between an "OFF" position, a "FORWARD" position in which the switch controls current flowing toward the motor in a first direction, and a "REVERSE" position in which the switch controls current flowing away from the motor in a second direction opposite to the first. In the preferred embodiment, the switch 42 is fixedly attached to the motor bracket 28, preferably by welding the switch casing to the bracket 28, or by suitable fasteners, such as rivets, screws, or the like. Alternatively, the switch 42 can be mounted to some other suitable, convenient part of the wheel assembly, such as the motor strap 30 or the wheel bracket 22, or to the trailer tongue 18. The control switch 42 is electrically connected to the motor 16 by conventional wiring 44 in a well-known manner. A 12-volt battery 40 (shown schematically in FIG. 2) provides power to the assembly and is preferably mounted to the trailer frame. The battery 40 is electrically connected to the switch 42 in a well-known manner by conventional wiring 46 in order to provide controlled electric current to the motor 16 through the switch 42. When the control switch 42 is activated, for example in the forward position, the motor 16 is activated so that the wheel 12 is rotated in a forward direction to move the trailer forward.

When the control switch 42 is activated in the reverse position, the motor 16 is activated so that the wheel 12 is rotated in the opposite direction to move the trailer backward. With the assembly so connected, the trailer can be moved forward or in reverse simply by selectively activating the switch 42 to either of two positions. The trailer can be readily turned by hand as the motorized wheel 12 is being operated to enable the user to precisely move the trailer into a desired position.

In an alternate embodiment, the switch 42 can be incorporated into a remote control device, such as a cabled or wireless transmitter (not shown), which is adapted to communicate with a receiver/controller (not shown) in a well-known manner and which is operably interconnected to the motor 16 and adapted to control the operation of the motor 16 from a position away from the trailer.

The motorized trailer wheel assembly utilizes a relatively simple drive mechanism. The motor and pinion gear can be readily disassembled from the circular rack, enabling the wheel to be easily removed for servicing. As well, the motorized drive assembly can be readily removed should it be desirable to operate the trailer without the motorized wheel. Because of the relatively small number of required components and the simplicity of the drive mechanism, the motorized trailer wheel assembly is relatively inexpensive to manufacture, durable, and compact.

While the invention has been specifically described in connection with certain specific embodiments thereof, it is to be understood that this is by way of illustration and not of limitation. Reasonable variation and modification are possible within the scope of the forgoing description and drawings without departing from the spirit of the invention.

What is claimed is:

1. A trailer with a tongue-mounted, adjustable jack having a ground-contacting end for supporting a trailer tongue when the trailer is disconnected from a towing vehicle, and a direct-drive motorized trailer wheel assembly attached to the jack for moving the disconnected trailer, the motorized trailer wheel assembly comprising:
    a wheel bracket mounted to the ground-contacting end of the jack;
    a wheel mounted to the wheel bracket and comprising a wheel rim and a circular gear-toothed rack mounted inwardly of the rim with the gear teeth extending radially inwardly;
    an electric motor having a rotating motor shaft, the motor shaft terminating in a pinion gear, the motor being removably mounted to the wheel bracket by a motor bracket, the motor shaft extending through the wheel bracket toward the wheel so that the pinion gear engages the rack;
    an electrical switch operably connected to the motor and controlling operation of the motor between an off position, a clockwise rotation position, and a counterclockwise rotation position for selectively alternating direction of rotation of the motor between a clockwise and a counterclockwise direction; and
    an electric power supply for providing electric power to the motor thereby rotating the motor shaft and pinion gear and urging the circular rack and wheel to rotate.

2. The trailer of claim 1 wherein the wheel further comprises a pneumatic tire.

3. The trailer of claim 1 wherein the wheel further comprises a solid rubber tire.

4. The trailer of claim 1 wherein the electric motor operates with a clockwise rotation when current is supplied to the motor in a first direction, and with a counterclockwise rotation when current is supplied to the motor in a second direction.

5. The trailer of claim 1 wherein the electric power supply is a 12-volt direct current power supply.

6. The trailer of claim 5 wherein the 12-volt direct current power supply is a battery.

7. The trailer of claim 6 wherein the battery is mounted to the trailer.

8. The trailer of claim 1 wherein the wheel is rotatable about a vertical axis.

9. The trailer of claim 1 wherein the switch is connected to the motor through electrical wiring.

10. The trailer of claim 1 wherein the switch is connected to the motor through a wireless transmitter, a receiver, and a controller.

11. A direct-drive motorized trailer wheel assembly for moving a trailer having an adjustable jack with a ground-contacting end for supporting a trailer tongue when the trailer is disconnected from a towing vehicle, comprising:
    a wheel bracket mounted to the ground-contacting end of the jack;
    a wheel mounted to the wheel bracket and comprising a wheel rim and a circular gear-toothed rack mounted inwardly of the rim with the gear teeth extending radially inwardly;
    an electric motor having a rotating motor shaft, the motor shaft terminating in a pinion gear, the motor being removably mounted to the wheel bracket by a motor bracket, the motor shaft extending through the wheel bracket toward the wheel so that the pinion gear engages the rack;
    an electrical switch connected to the motor through electrical wiring and controlling operation of the motor between an off position, a clockwise rotation position, and a counterclockwise rotation position for selectively alternating direction of rotation of the motor between a clockwise and a counterclockwise direction; and
    an electric power supply for providing electric power to the motor thereby rotating the motor shaft and pinion gear and urging the circular rack and wheel to rotate.

12. The motorized trailer wheel assembly of claim 11 wherein the wheel further comprises a pneumatic tire.

13. The motorized trailer wheel assembly of claim 11 wherein the wheel further comprises a solid rubber tire.

14. The motorized trailer wheel assembly of claim 11 wherein the electric motor operates with a clockwise rotation when current is supplied to the motor in a first direction, and with a counterclockwise rotation when current is supplied to the motor in a second direction.

15. The motorized trailer wheel assembly of claim 11 wherein the electric power supply is a 12-volt direct current power supply.

16. The motorized trailer wheel assembly of claim 15 wherein the 12-volt direct current power supply is a battery.

17. The motorized trailer wheel assembly of claim 16 wherein the battery is mounted to the trailer.

18. The motorized trailer wheel assembly of claim 11 wherein the wheel is rotatable about a vertical axis.

19. The motorized trailer wheel assembly of claim 11 wherein the switch is connected to the motor through electrical wiring.

20. The motorized trailer wheel assembly of claim 11 wherein the switch is connected to the motor through a wireless transmitter, a receiver, and a controller.

* * * * *